(12) United States Patent
Yamada et al.

(10) Patent No.: US 7,411,612 B2
(45) Date of Patent: Aug. 12, 2008

(54) PHOTOGRAPHED IMAGE COMPOSING APPARATUS AND A STORAGE MEDIUM STORING A PHOTOGRAPHED IMAGE COMPOSING PROGRAM

(75) Inventors: Yoichi Yamada, Kyoto (JP); Takao Sawano, Kyoto (JP); Tsutomu Araki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 707 days.

(21) Appl. No.: 10/937,375

(22) Filed: Sep. 10, 2004

(65) Prior Publication Data

US 2005/0057657 A1    Mar. 17, 2005

(30) Foreign Application Priority Data

Sep. 12, 2003    (JP) .............................. 2003-320790

(51) Int. Cl.
  *H04N 5/228* (2006.01)
(52) U.S. Cl. .............................. 348/222.1; 348/333.05; 348/24; 348/36
(58) Field of Classification Search .............. 348/222.1, 348/333.05, 42, 36
  See application file for complete search history.

(56) References Cited

U.S. PATENT DOCUMENTS

| 4,122,470 | A | 10/1978 | Loranger et al. |
|---|---|---|---|
| 5,621,869 | A | 4/1997 | Drews |
| 5,680,197 | A | 10/1997 | Hendrix |
| 5,687,306 | A | 11/1997 | Blank |
| 6,229,904 | B1 | 5/2001 | Huang et al. |
| 6,285,381 | B1 | 9/2001 | Sawano et al. |
| 6,720,997 | B1* | 4/2004 | Horie et al. ............... 348/218.1 |
| 6,731,302 | B1* | 5/2004 | Cote ........................... 345/619 |
| 7,010,152 | B2* | 3/2006 | Bojer et al. .................. 382/132 |
| 2001/0055028 | A1* | 12/2001 | Oka ........................... 345/629 |
| 2002/0171746 | A1* | 11/2002 | Stephany et al. ............ 348/239 |
| 2003/0002730 | A1 | 1/2003 | Petrich |
| 2005/0129324 | A1 | 6/2005 | Lemke |

FOREIGN PATENT DOCUMENTS

| JP | 2-106734 | 4/1990 |
|---|---|---|
| JP | 08-293038 | 11/1996 |
| JP | 10-240962 | 9/1998 |
| JP | 11-306366 | 11/1999 |
| JP | 2000-030040 | 1/2000 |
| JP | 2000-092306 | 3/2000 |
| JP | 2002-207244 | 7/2002 |

* cited by examiner

*Primary Examiner*—James M. Hannett
*Assistant Examiner*—Gevell Selby
(74) *Attorney, Agent, or Firm*—Nixon & Vanderhye P.C.

(57) ABSTRACT

A photographed image composing apparatus includes a CPU and an imaging unit. In this photographed image composing apparatus, an operator photographs an object's face in at least two partial images successively while aligning a predetermined region of the face with an imaging index displayed on a display, and boundary processing between partial images is performed and a montage image is produced. In the boundary processing, pixel data adjacent to a boundary line is extracted from a first image on one side of the boundary line and a second image on the other side of the boundary line, as first basic pixel data and second basic pixel data, respectively. Then, the pixel data of the first image and the second image are mixed with the second basic pixel data and the first basic pixel data in a pixel row that corresponds to the relevant pixel, respectively, based on previously stored mixing ratios in accordance with the distance from the boundary line.

9 Claims, 9 Drawing Sheets

MIXTURE: ORIGINAL PIXEL DATA × ITS PROPORTION + BASIC PIXEL DATA ON OPPOSITE SIDE IN THE SAME ROW × ITS PROPORTION

EX.: PIXEL m21 IN THE SECOND IMAGE
$m21'$ $(R'm21, G'm21, B'm21)$
 $= m21 \times 60\% + I11 \times 40\%$
 $= m21$ $(Rm21 \times 60\%, Gm21 \times 60\%, Bm21 \times 60\%)$
 $+ I11$ $(R11 \times 40\%, G11 \times 40\%, B11 \times 40\%)$

FIG. 7

| DISTANCE FROM BOUNDARY LINE (NO. OF PIXELS) | MIXING RATIO OF ORIGINAL PIXEL AND BASIC PIXEL DATA ON OPPOSITE SIDE |
|---|---|
| 1 | 50 : 50 |
| 2 | 60 : 40 |
| 3 | 70 : 30 |
| 4 | 80 : 20 |
| 5 | 90 : 10 |

PHOTOGRAPHED IMAGE COMPOSING APPARATUS AND A STORAGE MEDIUM STORING A PHOTOGRAPHED IMAGE COMPOSING PROGRAM

FIELD OF THE TECHNOLOGY

The present technology relates to a photographed image composing apparatus and a storage medium storing a photographed image composing program. More specifically, the present technology relates to a photographed image composing apparatus and a storage medium storing a photographed image composing program in which an object's face is photographed in at least two different partial images, that is, for example, the face is photographed for the upper half part of one person's face and for the lower half part of another person's face, and a montage image is composed from those partial images.

BACKGROUND AND SUMMARY

It is well known that a montage image is composed with the use of electronic images. For instance, Japanese Patent Laying-open No. 8-293038 laid open on Nov. 5, 1996, discloses a prior art system (first prior art). In this prior art, the orientation of the montage is considered in generating a montage image by face image composition with the selection of partial face patterns.

Japanese Patent Laying-open No. 2000-92306 laid open on Mar. 31, 2000, discloses another prior art system (second prior art). In this prior art, when two images having overlapping areas around a boundary between them are composed, as if they were joined together, in the boundary area to produce one image, an average value for image data on the overlapping areas is calculated and utilized to make a difference in color between the two images in the boundary area less visible, resulting in a natural composite image.

However, the first prior art could not provide an image composing apparatus that gives the enjoyment of taking a photograph. Also in the first prior art, since the production of a montage image has a limited selection of previously prepared face image parts, it is not possible to enjoy freer, more interesting image composition.

Meanwhile, in the second prior art, when one object is photographed in two images and they are joined together to obtain one complete picture of the object, in order to make the boundary line less visible in combining the overlapping areas, it is necessary to calculate an average value in the histogram of pixel data, further calculate an offset value based on a deviation from the average value, and add the offset value to pixel data on the overlapping images. Thus, this complicates and slows down the operation process, and does not suit situations where photographing peoples' faces can be freely enjoyed.

Therefore, it is feature of illustrative embodiments to provide a novel photographed image composing apparatus and a storage medium storing a photographed image composing program.

It is another feature of the illustrative embodiments to provide a photographed image composing apparatus and storage medium storing a photographed image composing program which make it possible to easily produce a montage image by casually, repeatedly photographing peoples' faces.

It is still another feature of the illustrative embodiments to provide a photographed image composing apparatus and a storage medium storing a photographed image composing program which, in composing a montage image from a plurality of partial images, allow boundary lines between the images to be made less visible through fast and simple processing.

A photographed image composing apparatus according to an exemplary embodiment is a photographed image composing apparatus for photographing a face in at least two different partial images and generating a montage image of the face from at least two photographed partial images. This photographed image composing apparatus comprises an imaging means, an image display means, an imaging guide displaying means, an operation means, a first image storing means, a second image storing means, a mixing ratio storage means, an image mixing means, and a montage image generating/displaying means. The imaging means photographs an object electronically. The image display means displays the object photographed by the imaging means. The imaging guide displaying means displays an imaging guide indicating the position of a predetermined region of the face on the image display means. The operation means inputs an input operation in accordance with an operation by an operator. The first image storing means, in response to the operation input from the operation means, stores image data from the imaging means that shows one of the partial images of the face, as a first image. The second image storing means, in response to the operation input from the operation means, stores image data from the imaging means that shows the other one of the partial images of the face adjacent to the first image, as a second image. The mixing ratio storage means stores the mixing ratios of pixel data of the first image and the second image, in accordance with the distance from a boundary line between the two partial images. The image mixing means mixes the first image and the second image based on the mixing ratios. The montage image generating/displaying means generates the montage image from the first image and the second image mixed by the image mixing means, and displays the montage image on the image display means.

More specifically, the photographed image composing apparatus photographs a face in at least two different partial images, and produces a montage image of the face from at least two photographed partial images. An object is electronically photographed by the imaging means (30), and the objects (90, 92) photographed by the imaging means are displayed on the image display means (18). Also the imaging guide display means (32, 62b, S1) displays the imaging guides (82a, 82b, 82c) indicating the positions of predetermined regions of the face on the image display means. By aligning the predetermined regions of a face with the imaging guides, it is possible to easily photograph partial images best suited to generating a montage image of the face. The operation means (20) inputs an operation input in accordance with an operation by an operator, and the operator takes a photograph by appropriately operating the operation means, for example, by performing a shutter operation. The first image storing means (32, 62c, 68a, S9, S11) stores image data from the imaging means that shows one of partial images of the face (84) as first image data, in response to the operation input from the operation means. The second image storing means (32, 62c, 68b, S9, S11) stores image data from the imaging means that shows the other one of partial images of the face (86) adjacent to the first image, in response to the operation input from the operation means. By these first and second image storing means, partial images to form a montage image are successively photographed and image data of these partial images are obtained. If there is a difference in color between the photographed partial images, the boundary line between the images becomes prominent. Thus, after photograph shooting, processing of the boundary line is performed. The mixing ratio storage means (76) stores the mixing ratios of pixel data of the first image and the second image depending on the distance from the boundary line (88) between the two partial images. Based on the mixing ratios stored in the mixing ratio storage means, the image mixing means (32, 62*e*, S21, S43, S45) mixes the first image and the second image. With this mixture, according to the distance from the boundary line, the first and second images are changed so as to reduce a color difference between them, resulting in the less visible boundary line. Furthermore, the montage image generating/displaying means (32, 62*f*, S23) generates a montage image from the first and second images mixed by the image mixing means, and displays the montage image on the image display means. Consequently, according to this photographed image composing apparatus, it is possible to take pleasure in photograph shooting and also enjoy freer and more interesting montage image composition. By just photographing partial images in a successive way, an operator can easily compose a montage image with less visible boundary line from the photographed images.

In a certain embodiment, the mixing ratio storage means stores mixing ratios determined in such a manner that pixel data of the first image and the second image closest to the boundary line are mixed with the largest amounts of pixel data of the second image and the first image, respectively, and that, as the distance from the boundary line on the first image and the second image increases, pixel data of the first image and the second image are mixed with gradually decreased amounts of pixel data of the second image and the first image, respectively.

More specifically, the mixing ratio storage means) stores predetermined mixing ratio data in advance. Based on the mixing ratios, the image mixing means mixes the first and second image data closest to the boundary line with the largest amounts of the second and first image data, respectively, and, as the distance from the boundary line on the first and second images increases, the image mixing means mixes pixel data of the first and second images with gradually decreased amounts of pixel data of the second and first images, respectively. Therefore, it is possible to bring pixels closest to the boundary line under much influence from the opposite-side partial image, and to change the image data in such a manner that the influence of the opposite-side image gradually decreases with distance from the boundary line, thereby reducing a color difference between the partial images. These mixing ratios are previously stored, so that it is possible to perform the mixing by relatively easy processing and make the boundary line less visible.

In a certain aspect, the photographed image composing apparatus further comprises a first basic pixel data storing means for storing pixel data on the first image along and adjacent to the boundary line as first basic pixel data, and a second basic pixel data storing means for storing pixel data on the second image along and adjacent to the boundary line as second basic pixel data. The image mixing means, based on the mixing ratios, mixes pixel data of the first image and the second image with the second basic pixel data and the first basic pixel data in a pixel row perpendicular to the boundary line that corresponds to the relevant pixel, respectively.

More specifically, pixel data of the opposite partial image to be used for image mixture is extracted and stored. That is, the first basic pixel data storing means (32, 62*d*, 72*a*, 74*a*, S35) stores the first image's pixel data along and adjacent to the boundary line as first basic pixel data. The second basic pixel data storing means (32, 62*d*, 72*b*, 74*b*, S35) stores pixel data of the second image along and adjacent to the boundary line as second basic pixel data. The image mixing means, based on the mixing ratios, mixes pixel data of the first and second images with the second basic pixel data and the first basic pixel data, respectively. This mixing uses basic pixel data in a pixel row perpendicular to the boundary line that corresponds to a pixel to be processed. In this way, since each of the relevant pixels comes under only the influence of this one basic pixel, it is possible to make the boundary line less visible through simple mixture processing.

A storage medium storing a photographed image composing program according to an illustrative embodiment, is a storage medium storing a photographed image composing program for photographing a face in at least two different partial images and generating a montage image from at least two photographed partial images in a photographed image composing apparatus that comprises at least an imaging means for electronically photographing an object, an image display means for displaying the object photographed by the imaging means, and an operation means for inputting an operation input in accordance with an operation by an operator. The photographed image composing program stored in this storage medium causes a processor of the photographed image composing apparatus to execute an imaging guide displaying step, a first image storing step, a second image storing step, an image mixing step, and a montage image generating/displaying step. The imaging guide displaying step displays an imaging guide indicating a position of a predetermined region of the face on the image display means. The first image storing step stores image data from the imaging means that shows one of the partial images of the face, as a first image, in response to the operation input from the operation means. The second image storing step stores image data from the imaging means that shows the other one of the partial images of the face adjacent to the first image, as a second image, in response to the operation input from the operation means. The image mixing step mixes the first image and the second images, based on mixing ratios of pixel data of the first image and the second image in accordance with the distance from the boundary line between the two partial images. The montage image generating/displaying step generates a montage image from the first image and the second image mixed in the image mixing step, and displays the montage image on the image display means. As well as the above mentioned photographed image composing apparatus, this storage medium storing the photographed image composing program is capable of easily composing a montage image with a less visible boundary line on the spot from partial images photographed in a successive way.

In a certain aspect, the photographed image composing apparatus further comprises a mixing ratio storage means for storing mixing ratios determined in such a manner that pixel data of the first image and the second image closest to the boundary line are mixed with the largest amounts of pixel data of the second image and the first image, respectively, and that, as the distance from the boundary line on the first image and second image increases, pixel data of the first image and the second image are mixed with gradually decreased amounts of pixel data of the second image and the first image, respectively. The image mixing step mixes the first image and the second image based on the mixing ratios stored in the mixing ratio storage means. As well as the above mentioned photographed image composing apparatus, the storage medium storing the photographed image composing program is capable of making the boundary line less visible through relatively low-load processing by the processor.

In another aspect, the photographed image composing program stored in the storage medium further includes a first basic pixel data storing step of storing pixel data on the first image along and adjacent to the boundary line as first basic pixel data, and a second basic pixel storing step of storing pixel data on the second image along and adjacent to the boundary line as second basic pixel data. The image mixing step mixes pixel data of the first image and the second image with the second basic pixel data and the first basic pixel data in a pixel row perpendicular to the boundary line that corresponds to the relevant pixel, respectively, based on said mixing ratios. As well as the above mentioned photographed image composing apparatus, the storage medium storing the photographed image composing program is capable of making the boundary line less visible through simple processing.

According to the illustrative embodiments, it is possible to offer the pleasure of photograph shooting and also enjoy freer, more interesting montage image composition. By photographing partial images in a successive way, an operator can instantly compose a montage image with a less visible boundary line from the photographed images in a simple way. Therefore, the operator can casually enjoy producing a montage image.

In addition, if mixing ratios of two images are stored in advance, it is possible to mix the images and make the boundary line between them less visible through simple processing without the need to calculate the mixing ratios again later.

Furthermore, if pixel data adjacent to the boundary line is stored as basic pixel data used for mixing the images, one piece of the basic pixel data in a pixel row that corresponds to the relevant pixel is used in the mixing, which allows the boundary line to be less visible through simple processing.

The above described features, aspects and advantages of the illustrative embodiments will become more apparent from the following detailed description when taken in conjunction with the accompanying drawings.

BRIEF DESCRIPTION OF THE DRAWINGS

FIG. 7 is an illustrative view showing one example of image mixing ratio data;

DETAILED DESCRIPTION OF THE PREFERRED EMBODIMENTS

Figure 1:
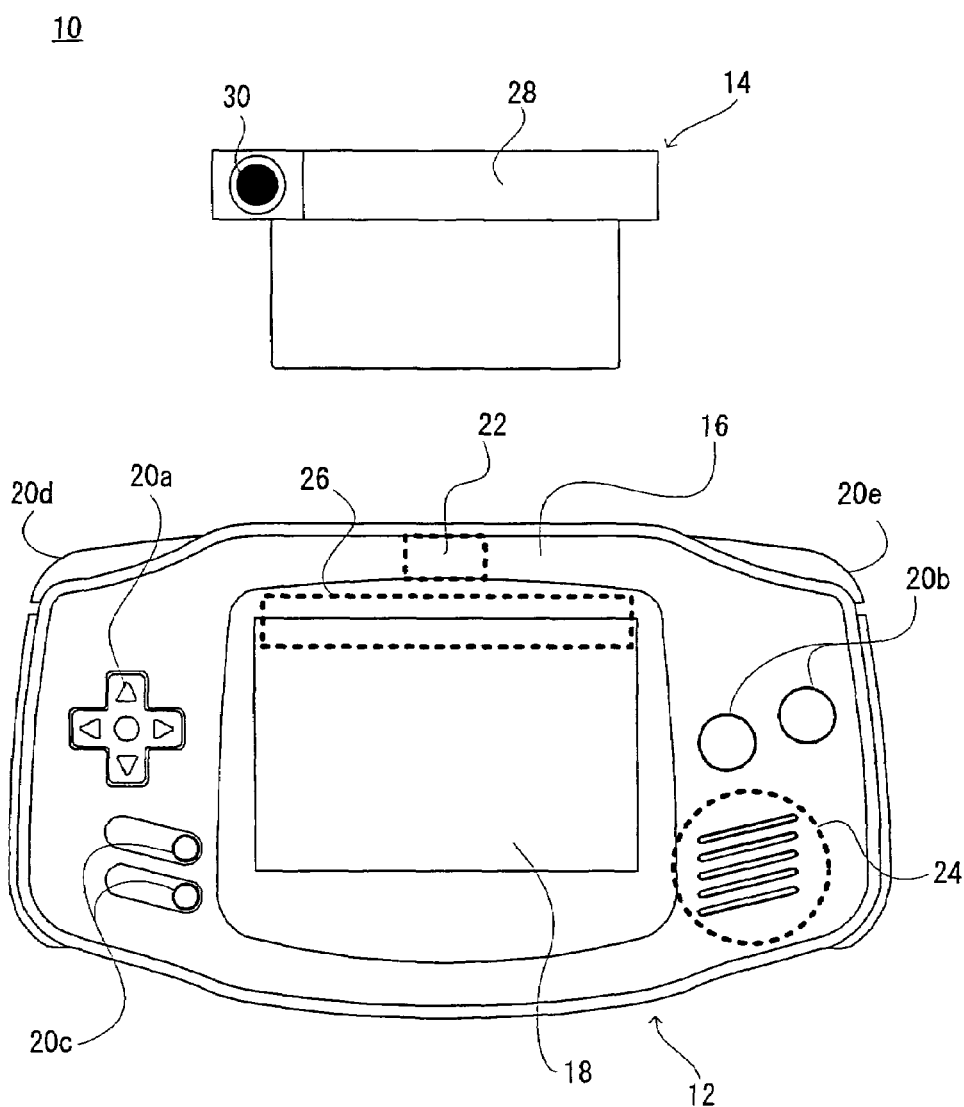
FIG. 1 is an outline view showing a photographed image composing apparatus of one of the illustrative embodiments.

A photographed image composing apparatus 10 of this embodiment shown in FIG. 1 is used to photograph an object's face in at least two different partial images and produce a montage image from at least two photographed partial images, and this system can be implemented in the form of a game apparatus as an example. This game apparatus 10 includes a game machine 12 and a camera cartridge 14 mounted on the game machine 12.

The game machine 12 is a portable game machine in a size capable of being held with both hands, that allows an operator to enjoy various games by changing cartridges which are removable external storage media storing game programs, data, etc. As a cartridge, the camera cartridge 14 equipped with an electronic imaging function is used in this embodiment. The game machine 12 includes a housing 16, for example, in an oblong shape. One main surface (front side) of the housing 16 is provided with a liquid crystal display 18 (hereinafter abbreviated as "LCD"), as an example of an image display means, in the approximate middle thereof, and is also provided with various operation switches 20, as an operation means, on the right and left sides of the LCD 18.

The operation switches 20 include, for example, a direction switch 20*a*, action switches 20*b*, start/select buttons 20*c*, an L button 20*d* provided on the left corner of the housing 16, and an R button 20*e* provided on the right corner of the housing 16. The direction switch 20*a* is used, for example, to specify a direction in which a character (not illustrated) should move when operating the character during a game, and to move a cursor for the selection of an option. The action switches 20*b* are used, for example, to specify the action of a character (e.g. making a jump) and to determine/cancel the selection of an option. The L button 20*d* is used as a shutter button or the like at the time of photograph shooting. The R button 20*e* is used for the other photographic operations (e.g. the cancellation of photograph shooting). The start/select buttons 20*c* are used to start playing a game or stop a game operation. Since the LCD 18 displays game contents processed by the game apparatus 10 and data on images photographed by the camera, an operator can enjoy game views and images photographed by the camera, which are displayed on the LCD 18, by operating the above mentioned various operation switches 20.

Figure 2:
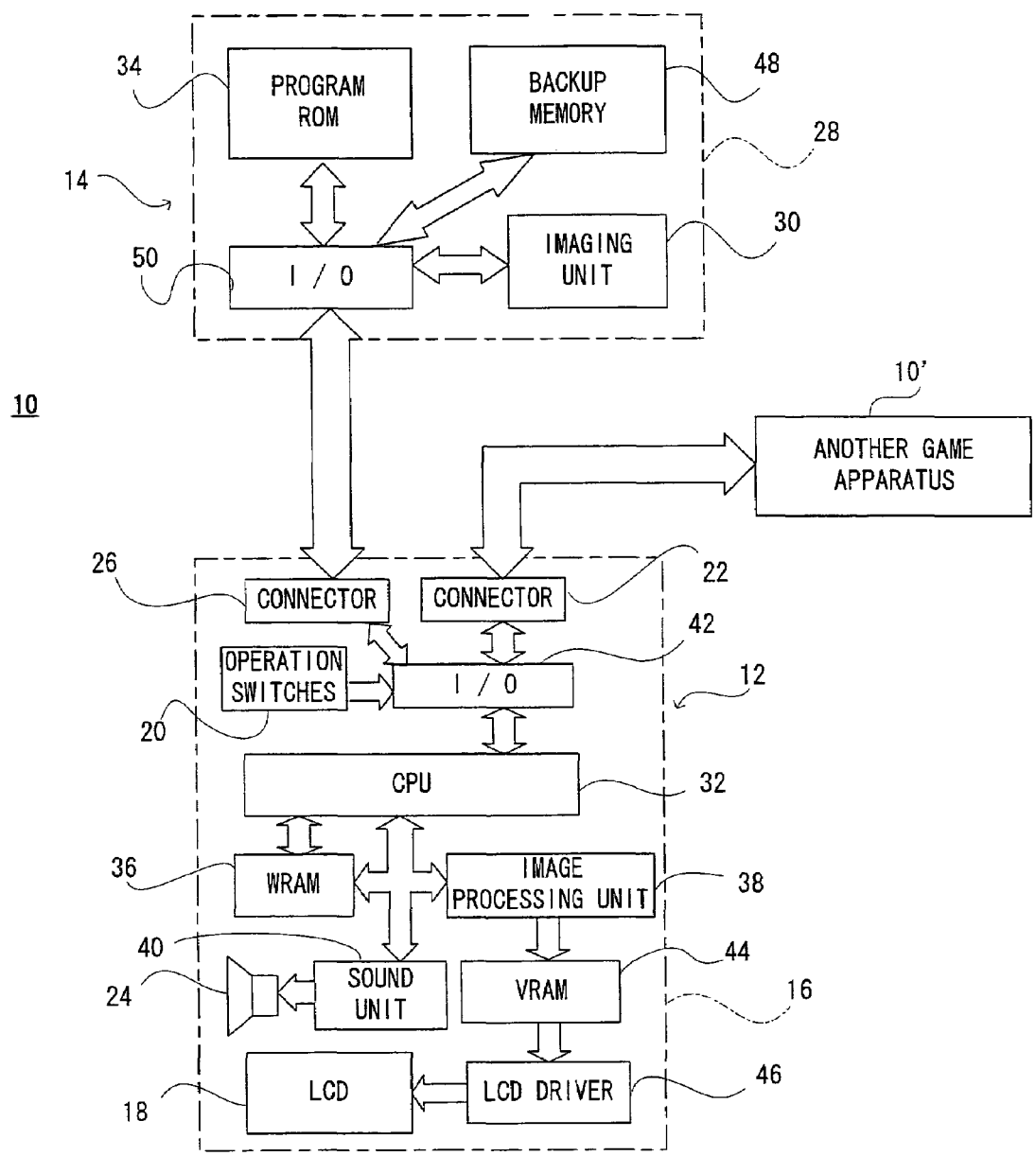
FIG. 2 is a block diagram showing one example of the internal structure of the photographed image composing apparatus of a FIG. 1 embodiment.

The game machine 12 is also provided with a connector 22 on the upper side thereof as necessary. As shown in FIG. 2, the connector 22 is used to enjoy a communication game in connection with another game apparatus 10' (or another game machine 12'), and to transmit and receive data on game contents processed by the game machine 12 and data on images photographed by the camera, etc. to/from the other game apparatus 10'. Additionally, a speaker 24 is included on the inside of sound release holes provided on the surface of the housing 16, which outputs sounds such as BGM and sound effects during a game.

The camera cartridge 14 includes a housing 28 that is attachable to and detachable from the game machine 12 via a connector 26 provided on the rear of the housing 16, and an imaging unit 30. When the camera cartridge 14 is inserted into and connected with the game machine 12 via the connector 26, the game machine 12 functions as game apparatus with imaging capabilities.

FIG. 2 is a block diagram of the game apparatus 10 in the configuration that the game machine 12 and the camera cartridge 14 are connected. Referring to FIG. 2, the game machine 12 includes a CPU 32. The CPU 32 is also called a processor or computer, and performs game processing and imaging processing, etc., in accordance with programs in program ROM 34 contained in the camera cartridge 14. The CPU 32 is connected with a working RAM (hereinafter abbreviated as "WRAM") 36, an image processing unit 38, a sound unit 40, an input/output interface (hereinafter abbreviated as "I/O") 42.

The WRAM 36 is used as a working area or buffer area for the CPU 32. The CPU 32 loads data required for game processing, and stores data generated during game processing so as to perform a data update in the WRAM 36. The image processing unit 38 is connected with video RAM (hereinafter abbreviated as "VRAM") 44. Under the direction of the CPU 32, the image processing unit 38 generates image data to be displayed on the basis of data temporarily stored in the WRAM 36. The VRAM 44 temporarily stores the image data for display generated by the image processing unit 38. The image data stored in the VRAM 44 is displayed on the LCD 18 via an LCD driver 46. The sound unit 40 converts sound data generated in relation to game processing by the CPU 32 into analog signals, and outputs the signals as music or sound effects from the speaker 24.

The I/O 42 connects the CPU 32 with the operation switches 20, the connector 26 (the camera cartridge 14), and the connector 22 (the other game apparatus 10'). The CPU 32 receives data from the operation switches 20 via the I/O 42 and uses it for program processing. The CPU 32 also controls the camera cartridge 14 via the I/O 42. The CPU 32 further transmits/receives data to/from the other game apparatus 10' via the connector 22 connected to the I/O 42.

The camera cartridge 14 comprises the imaging unit 30, the program ROM 34, and a backup memory 48 inside the housing 28 thereof, and they are connected to a cartridge input/output interface (hereinafter abbreviated as "cartridge I/O") 50. The imaging unit 30 includes an electronic photosensitive device as an imaging device, such as a CMOS sensor or CCD, and outputs light information obtained by light exposure (color information or luminance information or the like) in the form of digital data. The program ROM 34 fixedly stores programs and data that allow the game apparatus 10 to function as a photographed image composing apparatus. The backup memory 48 is writable/readable memory for storing information on the progress of a game, and data on images photographed by the imaging unit 30, etc. For example, a flash memory, which is a nonvolatile memory, and SRAM deriving power from batteries, etc. are used as the backup memory 48. When the camera cartridge 14 is attached to the game machine 12, the cartridge I/O 50 is connected with the CPU 32 via the connector 26 and the I/O 42. Due to this, the CPU 32 is capable of accessing the imaging unit 30, the program ROM 34 and the backup memory 48 via the cartridge I/O 50 to control the camera cartridge 14 or to transmit/receive data to/from the camera cartridge 14.

It is noted that, although, in this embodiment, the individual game machine 12 and camera cartridge 14 are connected, they may be integrally formed, that is, the imaging unit 30, the program ROM 34 and the backup memory 48 may be contained in the game machine 12.

In this manner, by attaching the camera cartridge 14 to the portable game machine 12 integrally provided with the LCD 18, it becomes possible to display a photographed image on the display screen (LCD 18) immediately, which thus allows photograph shooting corresponding to using an electronic camera or digital camera.

Although a description is provided here only regarding the game machine 12 with the LCD 18 integrally formed, it may be possible to impart equal functions to a stationary video game machine that is connected to a home TV set (CRT). In such a case, if the game machine 12 is a stationary video game machine, it also may be possible to provide the operation switches 20 on a game controller that is separated from the video game machine, instead of integrally forming the switches on the housing 16.

Figure 3:
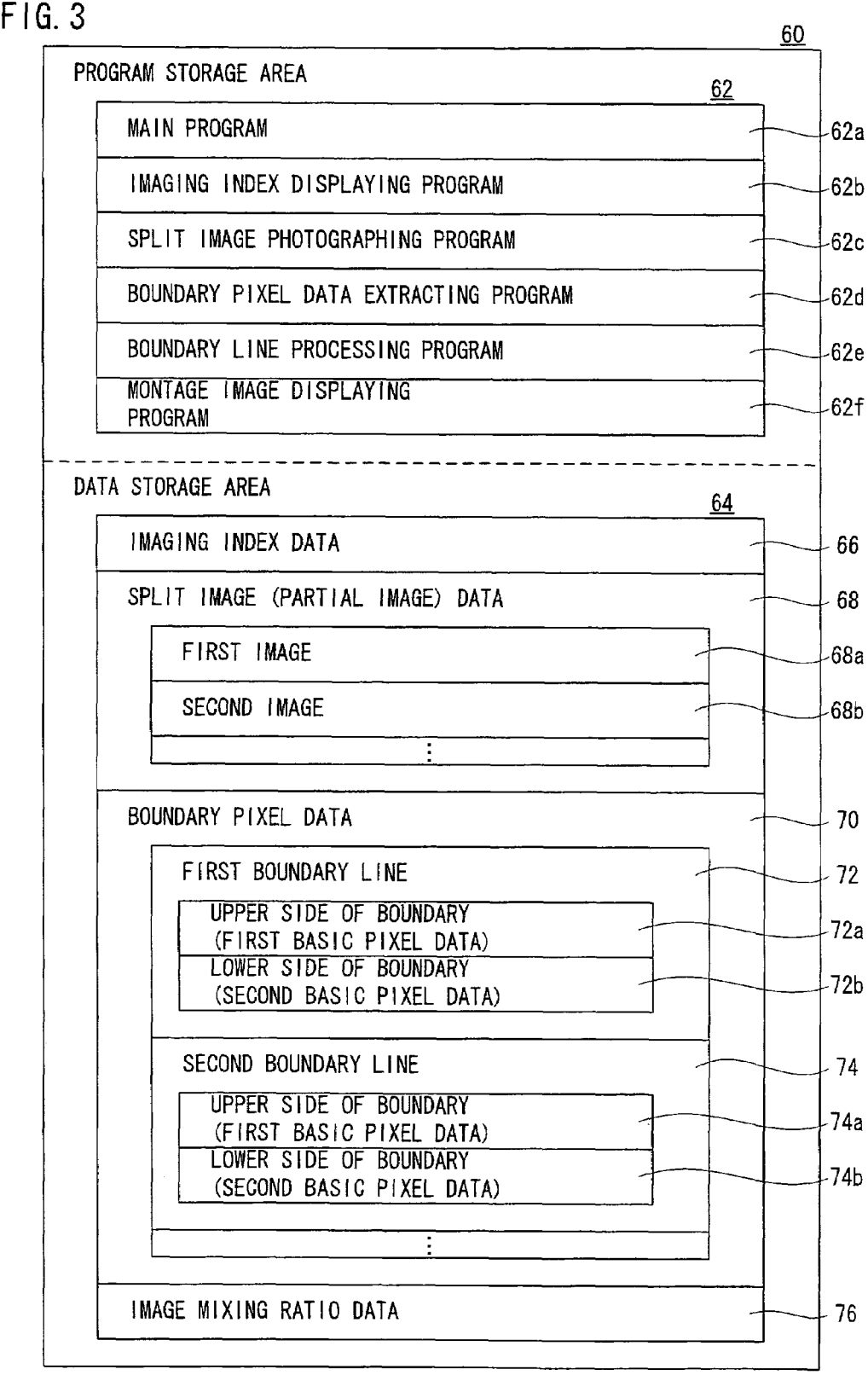
FIG. 3 is an illustrative view showing one example of a memory map of a WRAM in FIG. 2.

FIG. 3 shows one example of the memory map 60 of the WRAM 36 when the game apparatus 10 functions as a photographed image composing apparatus according to the present invention. The memory map 60 may be roughly divided into a program storage area 62 and a data storage area 64. The program storage area 62 stores various programs that are to be executed by the CPU 32 and makes the game machine 12 function as a photographed image composing apparatus according to the present invention. The data storage area 64 stores various data to be used by the programs stored in the program storage area 62. The data storage area 64 is also an area for temporarily storing data resulting from program processing.

The memory map 60 is described above as a memory map of the WRAM 36, but if the ROM 34 fixedly storing programs can be connected directly to the CPU 32 as is the case with the game apparatus 10 of this embodiment, it is not necessary to transfer programs and data to the WRAM 36 for the purpose of data retention. In this case, some portions of the program storage area 62 and data storage area 64 can be fixedly formed in the ROM 34, which allows the CPU 32 to access directly the ROM 34. However, if such a form is adopted, it is necessary to store only read-only data in the ROM 34 because the ROM 34 is not writable.

The program storage area 62 includes a main program storage area 62a, an imaging index displaying program storage area 62b, a split image photographing program storage area 62c, a boundary pixel data extracting program storage area 62d, a boundary line processing program storage area 62e, and a montage image displaying program storage area 62f.

The main program storage area 62a stores main programs for performing typical operations, for example, obtaining the operation input by an operator from the operation switches 20 and displaying game characters and photographed images.

Figure 4:
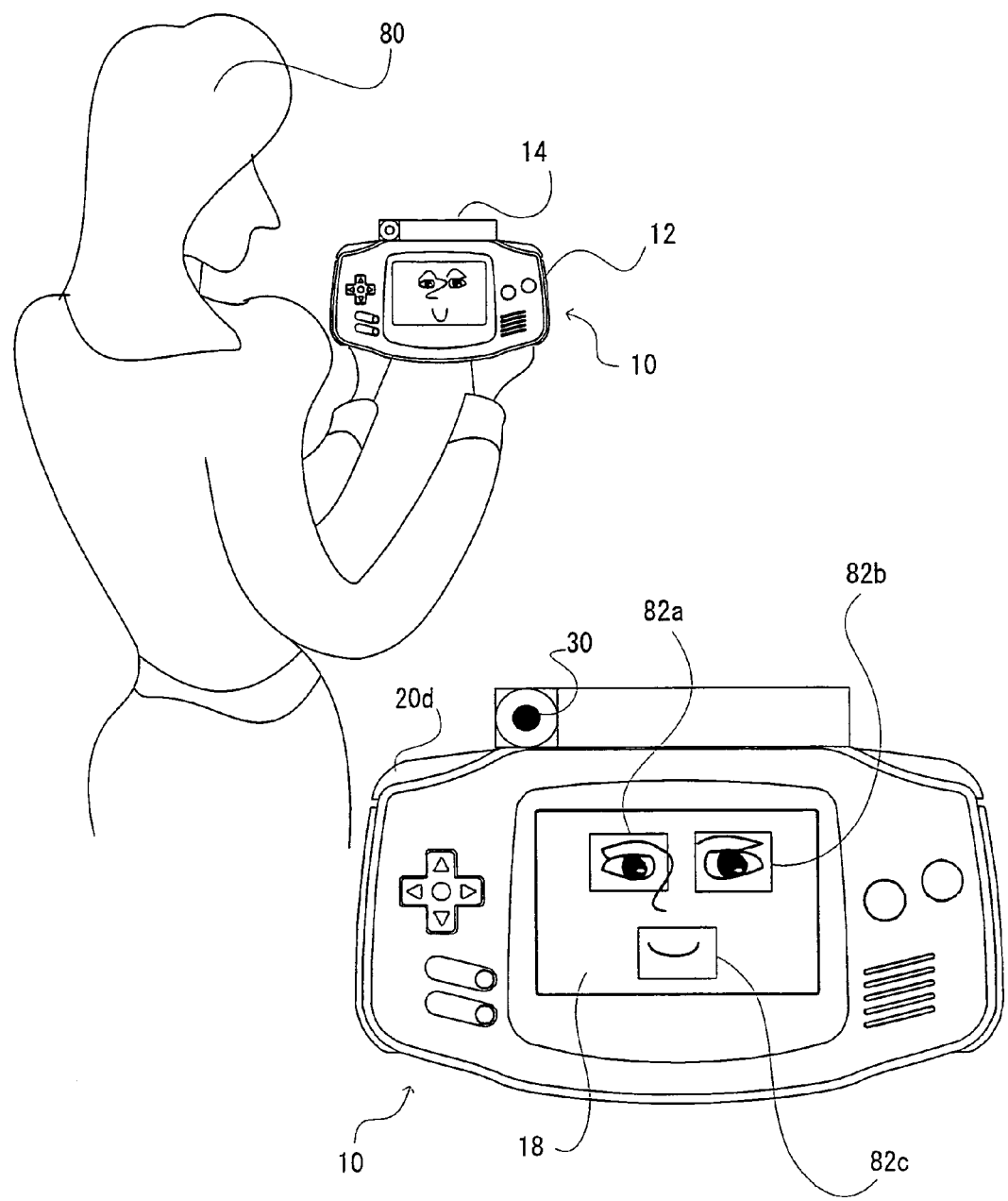
FIG. 4 is an illustrative view showing an outline of a scene in which an object is photographed with the use of the photographed image composing apparatus of the FIG. 1 embodiment.

The imaging index displaying program storage area 62b stores a program for displaying the imaging index (imaging guide) 82 on the LCD 18. The imaging index 82 indicates the position of a predetermined region of an object's face, and is displayed in a predetermined position of the LCD 18. Thus, by taking a photograph in such a manner that the predetermined position of the object's face is aligned with the imaging index 82, an operator 80 (FIG. 4) can obtain image data on a partial image of the face that is most suitable for the production of a montage photograph. In this embodiment, as shown in FIG. 4, the imaging indexes 82 include a right eye index 82a, a left eye index 82b, and a mouth index 82c that indicate the positions of an object's eyes and month, for example. Each index 82 is rectangular-shaped in an individually predetermined size. By adjusting a photographing position in such a manner that the regions of a face fit into the indexes 82, it is possible to photograph partial images best suited to generating a montage image.

The split image photographing program storage area 62c stores a program for photographing an object's face in at least two partial images as a first image, a second image, etc. Under this program, when the operator 80 performs a shutter operation such as pressing the L button 20d in taking a photograph in real time using the imaging unit 30, photographic data on one of the photographed partial images is captured and stored as still image data in the WRAM 36. By repeatedly taking photographs, image data of all partial images for generating a montage image can be stored.

Figure 5:
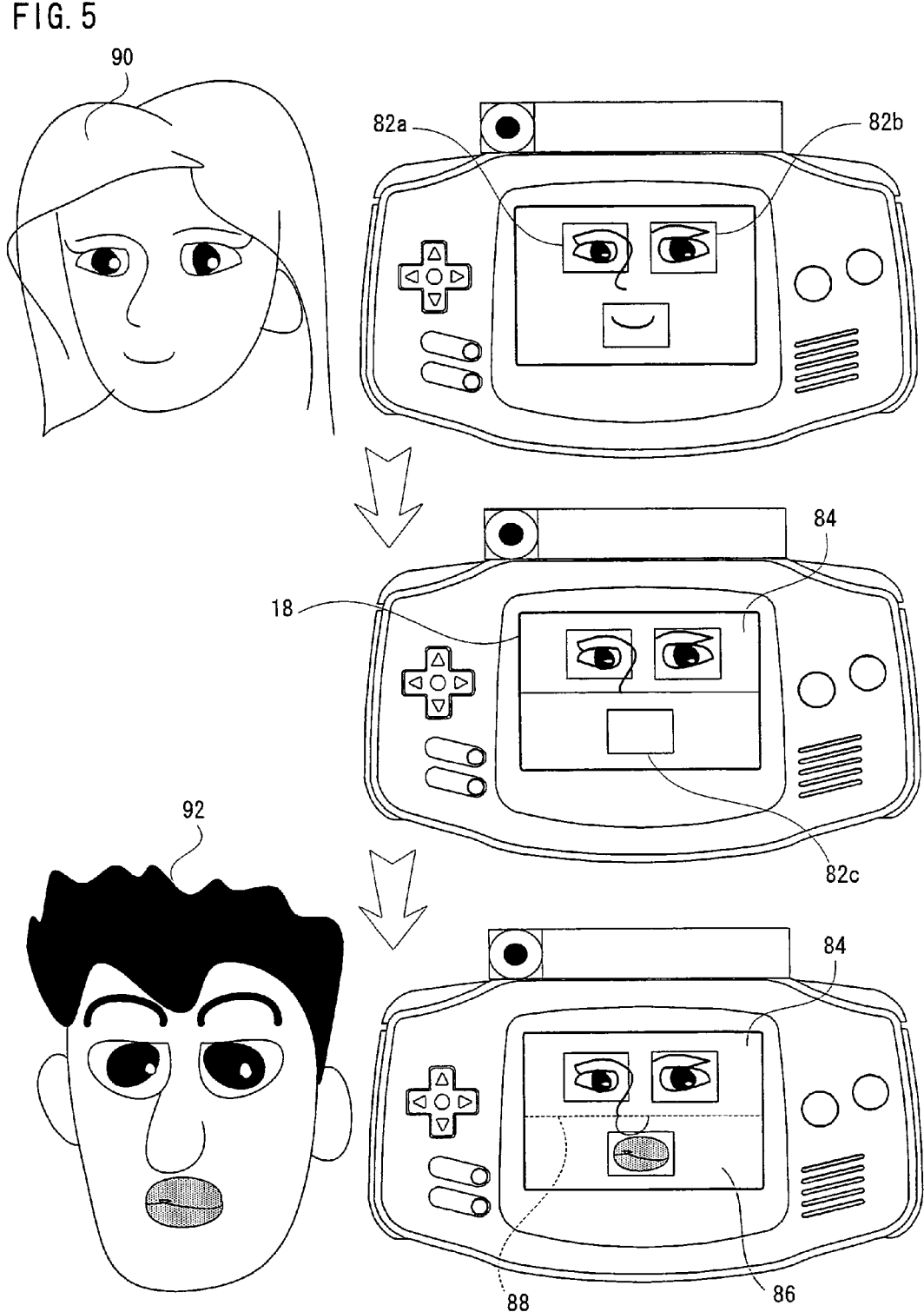
FIG. 5 is an illustrative view showing an outline of a scene in which a montage image is produced with the use of the photographed image composing apparatus of the FIG. 1 embodiment.

In this embodiment, as illustrated in FIG. 5, the face of an object is photographed in at least two images: for example, a partial image 84 for the upper half part including eyes, and a partial image 86 for the lower half part including a mouth.

During photograph shooting, the LCD 18 displays the above-mentioned right eye index 82*a* and left eye index 82*b* in the area for displaying the partial image 84 of the upper half part of a face, and displays the above-mentioned mouth index 82*c* in the area for displaying the partial image 86 of the lower half of a face. This makes it possible to easily photograph the partial image 84 of the upper half part of a face and the partial image 86 of the lower half part of a face.

As shown in FIG. 5, there exists a boundary line 88 between adjacent partial images. The boundary pixel data extracting program storage area 62*d* stores a program for extracting pixel data located in the portion closest to the boundary line 88, regarding each boundary line 88 between partial images, that is, pixel data along and adjacent to the boundary line 88 as boundary pixel data, from each partial image data. The boundary pixel data is used for boundary line processing.

The boundary line processing program storage area 62*e* stores a program for performing boundary line processing in which partial images are mixed on the basis of mixing ratio data. More specifically, under this program, pixel data on one partial image is mixed with pixel data on the other partial image in accordance with the mixing ratios depending on the distance from the boundary line 88, and thus the boundary line 88 is processed so as to make it less visible.

The montage image displaying program storage area 62*f* stores a program for generating a montage image from a combination of partial images that have undergone mixture processing by the boundary line processing program and for displaying the montage image on the LCD 18.

The data storage area 64 includes an imaging index data storage area 66, a split image (partial image) data storage area 68, a boundary pixel data storage area 70, and an image mixing ratio data storage area 76.

The imaging index data storage area 66 stores data on the imaging index 82 displayed on the LCD 18 by the imaging index displaying program: for example, the storage area 66 stores position data and image data, etc. for displaying the right eye index 82*a*, the left eye index 82*b*, and the mouth index 82*c* as shown in FIG. 4 in predetermined positions.

The split image data storage area 68 has storage areas depending on the number of partial images photographed, that is, the number of split parts of a face (a first image storage area 68*a*, a second image storage area 68*b* . . . ), and also stores partial image data (first image data, second image data . . . ) that have been captured from the imaging unit 30 and obtained by a shutter operation of the operator 80 in the split image photographing program.

The boundary pixel data storage area 70 has storage areas for each boundary line 88 depending on the number of the boundary lines 88 between partial images (a first boundary line storage area 72, a second boundary line storage area 74, . . . ), and also stores boundary pixel data for each boundary line 88 that has been extracted from image data on each partial image by the boundary pixel data extracting program. The boundary pixel data is used for boundary line processing. The boundary pixel data includes pixel data in the part adjacent to the boundary line 88 that has been extracted from the partial image 84 on one side (the upper side in this embodiment) of the boundary line 88, and pixel data in the part adjacent to the boundary line 88 that has been extracted from the partial image 86 on the other side (the lower side in this embodiment). They are here referred to as first basic pixel data and second basic pixel data, respectively (see FIG. 6). Each of the boundary line storage areas has areas 72*a*, 74*a* . . . for storing the first basic pixel data, and areas 72*b*, 74*b* . . . for storing the second basic pixel data.

The image mixing ratio data storage area 76 stores image mixing ratio data that is used in mixing the colors of pixels in partial images with the boundary line 88 between them during boundary line processing. FIG. 7 shows one example of image mixing ratio data. The mixing ratio data, as described in FIG. 7, includes data on the mixing ratios of the original pixel data and the basic pixel data on the opposite-side partial image, associated with the distance from the boundary line 88 (the number of pixels). The mixing ratios are configured in such a manner that original pixel data closest to the boundary line 88 (equivalent to the distance of one pixel) is mixed with a the largest amount of basic pixel data on the opposite side, and that, as the distance from the boundary line 88 increases, the original pixel data is mixed with a gradually decreasing amount of basic pixel data on the opposite side. In this embodiment, more specifically, mixing ratios are established in such a simplified manner that, for pixels adjacent to the boundary line 88, that is, pixels located at a distance of one pixel from the boundary line 88, 50% of original pixel data is mixed with 50% of basic pixel data on the opposite side, and that, as the distance from the boundary line 88 increases, the proportion of the original pixel data gradually increases by 10% and the proportion of the basic pixel data on the opposite side gradually decreases by 10%. In this embodiment, the mixing ratios are determined with respect to the distances of up to five pixels on either side from the boundary line 88.

This game apparatus 10 allows the photographing of an object using the above mentioned camera cartridge 14, similar to electronic cameras and digital cameras. Referring to FIG. 4, in taking a photograph with the use of the game apparatus 10, the operator 80 holds the game apparatus 10 in hands and directs the imaging unit 30 provided on the camera cartridge 14 toward an object (in FIG. 4, the operator 80 herself). The image of an object's face is captured by the imaging unit 30 and then is displayed in real-time on a photographed image display area of the LCD 18. In the example shown in FIG. 4, the photographed image display area is established in the entire screen of the LCD 18. In this embodiment, since the imaging indexes 82 (the right eye index 82*a*, left eye index 82*b*, and mouth index 82*c*) are displayed on the LCD 18 during photograph shooting, the operator 80 simply adjusts the position of the game apparatus 10 so as to align the right eye, left eye and mouth of an object displayed on the LCD 18 with the imaging indexes 82. Then, by pressing the L button 20*d* for a shutter operation, photographic data at that moment is stored as still image data in the WRAM 36 and the still image is displayed on the LCD 18.

In addition, with the game apparatus 10, it is possible to photograph peoples' faces successively and produce a montage image instantly. In photographing images for a montage image, the operator 80 sequentially photographs at least two partial images to be used for a montage image, as shown in FIG. 5. In this embodiment, since the image of a face may be split, for example, vertically into two, two partial images are photographed. First, one object 90 is photographed as illustrated in the top of FIG. 5. When the photograph is taken in alignment with the imaging indexes 82 (the right eye index 82*a* and left eye index 82*b*) in the above-mentioned way, image data on the partial image 84 of the upper half part of the face is stored as first image data in the split image data storage area 68 of the WRAM 36, and also the photographed partial image 84 is displayed on the LCD 18 as shown in the middle of FIG. 5. Then, the operator 80 photographs the partial image 86 of the lower half part of the face of another object 92. In photographing the other object 92, the image captured by the imaging unit 30 is displayed in real-time, together with the mouth index 82*c*, in the area for the lower half part of the face on the LCD 18. By aligning the mouth of the object 92 with the mouth index 82c on the LCD 18, the operator 80 can easily photograph the partial image 86 best suitable for a montage image of a completed face, as shown in the lower portion of FIG. 5. Then in response to a shutter operation, image data on the partial image 86 of the lower half part of the face is stored as second image data in the split image data storage area 68 of the WRAM 36, and also the partial image 86 is displayed on the LCD 18 together with the previously photographed partial image 84. It is noted that, in the example shown in FIG. 5, the previously photographed partial image 84 is displayed during the photographing of the partial image 86 to be photographed later so as to easily align the face lines of the two partial images. Alternatively, during the photographing of the latter partial image 86, instead of the former partial image 84, the imaging indexes 82 (the right eye index 82a and left eye index 82b) may be displayed together with data from the imaging unit 30 in the area for the upper half part of a face.

It is noted that, even in the case where a montage image is produced from more than three split images, partial images can be photographed successively in the same manner.

If there is an extreme difference in color between at least two partial images photographed in this way, the boundary line 88 between the partial images may be prominent. In such a case, the resulting montage image gives an unnatural, uncomfortable impression with a feeling of cut-and-paste, which may impair the enjoyment of producing a montage image. Thus, in the game apparatus 10, the boundary line processing for mixing the colors of partial images is performed after photograph shooting in order to make the boundary line 88 between the partial images less visible.

It is also noted that, before or after the boundary line processing, luminance adjustment may be performed if necessary. By adjusting luminance data so as to unify brightness between the partial images photographed in a successive manner, a more natural, pleasurable-to-see montage image can be produced.

Figure 6:
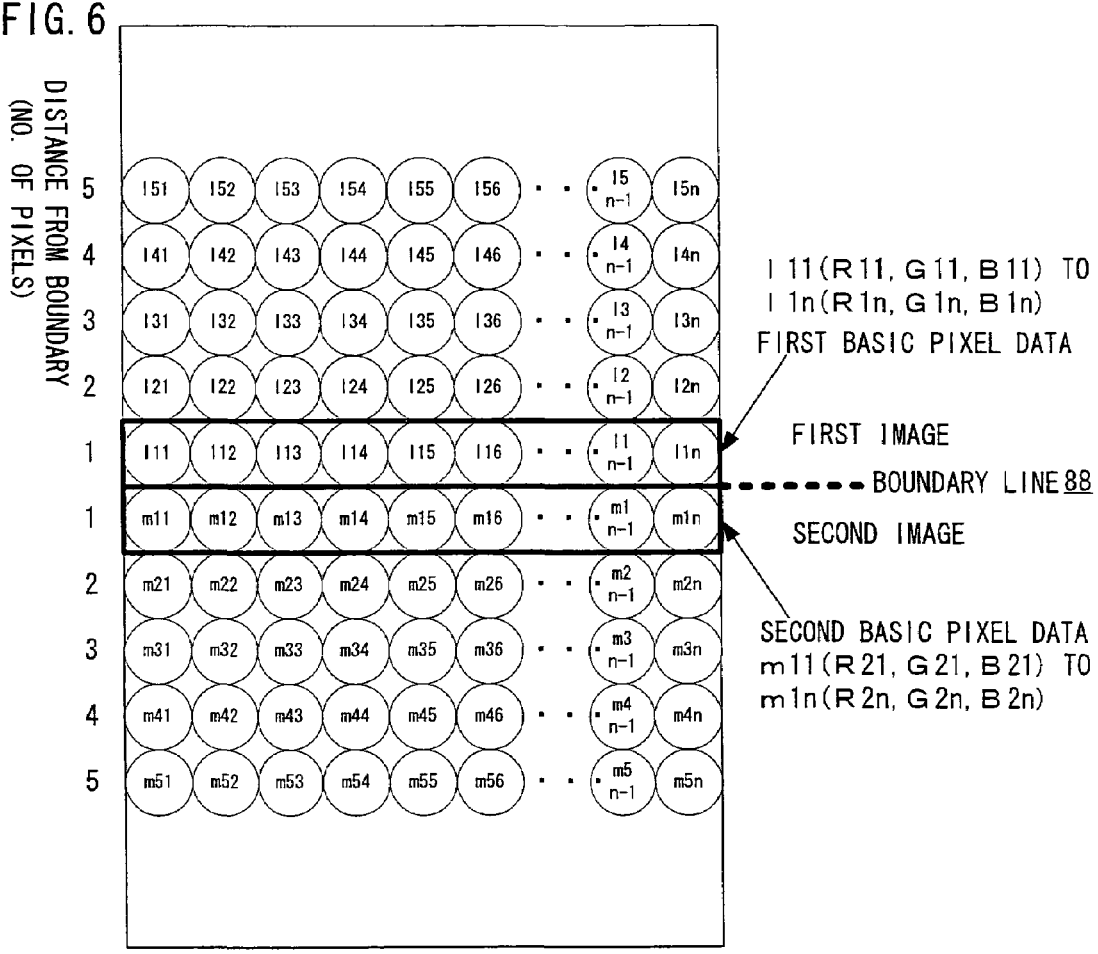
FIG. 6 is an illustrative view for explaining the mixing of partial images in generating a montage image.

In the boundary line processing, data on pixels adjacent to the boundary line 88 is previously stored, and is then mixed with the image on the opposite side at a predetermined ratio. Thus, in this embodiment, pixel data along and adjacent to the boundary line 88 is used as pixel data to be mixed in such a manner that the influence of the closest pixels is exerted on image data on the opposite side. In other words, for each boundary line 88, first basic pixel data and second basic pixel data are firstly extracted from two partial images with the boundary line 88 between them, respectively, and then they are stored in the boundary pixel data storage area 70 of the WRAM 36. More specifically, as shown in FIG. 6, all the pixel data along and adjacent to the boundary line 88 in a first image on the upper side of the boundary line 88, that is, n pieces of pixel data from pixel l11 to l1n, are stored as first basic pixel data. At the same time, all the pixel data along and adjacent to the boundary line 88 in a second image on the lower side of the boundary line 88, that is, n pieces of pixel data from pixel m11 to m1n, are stored as second basic pixel data. Herein, n corresponds to the number of horizontal pixels in the photographed image display area. Each pixel data includes data on three component colors of R, G and B. The first basic pixel data is expressed as l11 (R11, G11, B11) to l1n (R1n, G1n, B1n), and the second basic pixel data is expressed as m11 (R21, G21, B21) to m1n (R2n, G2n, B2n).

Then, for each boundary line 88, on the basis of the mixing ratio data, pixel data on the partial image on one side are mixed with the second basic pixel data extracted from the partial image on the other side, and also pixel data on the partial image on the other side are mixed with the first basic pixel data extracted from the partial image on the one side. More specifically, the mixing is performed by totalling the original pixel data multiplied by its proportion and the basic pixel data on the opposite side in the pixel row corresponding to the original pixel (perpendicular to the boundary line 88), that is, the same pixel row, multiplied by its proportion. Taking as an example the pixel m21 included in the second image shown in FIG. 6, since the pixel m21 is at a distance of two pixels from the boundary line 88, a mixing rate of 60:40 is applied in accordance with the distance (see FIG. 7). Then, the pixel data (Rm21, Gm21, Bm21) on the pixel m21 multiplied by its proportion of 60% and the pixel data (R11, G11, B11) on the pixel l11 multiplied by its proportion of 40% in the first basic pixel data in the pixel row (1) corresponding to the pixel m21, are totalized, and the resulting pixel data (R'm21, G'm12, B'm21) is taken as pixel data on the pixel m21 after the boundary processing.

In this way, based on the mixing ratios, five pixels on either side perpendicular to the boundary line 88 are all mixed with the basic pixel data on the other side in this embodiment. The mixing ratio data, as described above, is determined in such a manner that the pixels closest to the boundary line 88 are mixed with the largest amount of the basic pixel data on the opposite side, and that the amount of mixed basic pixel data on the opposite side gradually decreases with distance from the boundary line 88. Therefore, pixels closer to the boundary line 88 are increasingly influenced by the pixel data (basic pixel data) on the opposite side, and the degree of the influence is gradually reduced with distance from the boundary line 88. Consequently, in this embodiment, pixel data on each partial image in the vicinity of the boundary line is changed within a range of five pixels on each side, and color differences between the partial images are reduced, which makes the boundary line 88 less visible. In addition, for this mixing, only basic pixel data in a pixel row corresponding to a pixel to be processed is used so as to put the original pixel under the influence of only one basic pixel in the same row, and thus it is possible to make the boundary line 88 less visible through simple processing.

Figure 8:
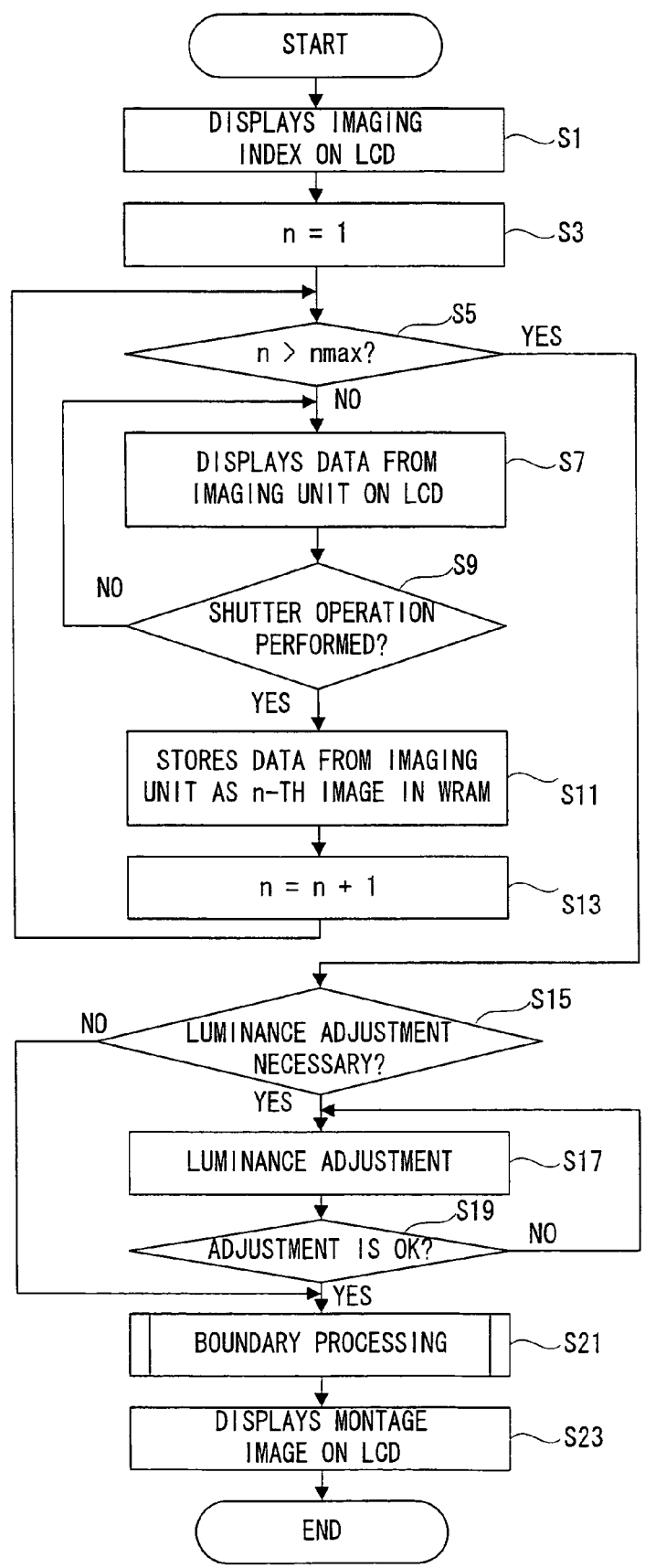
FIG. 8 is a flowchart showing one example of montage image generating operation in the photographed image composing apparatus of the FIG. 1 embodiment.

FIG. 8 shows one example of operation of montage image production in the game apparatus 10. First, in step S1, the CPU 32 of the game apparatus 10 reads imaging index data from the imaging index data storage area 66 of the ROM 34 or WRAM 36, and displays the imaging indexes 82 (the right eye index 82a, the left eye index 82b, and mouth index 82c) on the LCD 18 via the image processing unit 38, and the LCD driver 46, etc. Next, in step S3, the CPU 32 assigns 1as the initial value to a variable n for counting the number of partial images photographed. Subsequently, in step S5, the CPU 32 determines whether or not the variable n has become larger than a predetermined value nmax. The predetermined value nmax is the number of partial images to be photographed or the number of split face images, and may be fixed in advance or may be designated through an entry by the operator 80. The nmax is 2 in the example of an image vertically split in two in FIG. 5.

If "NO" in step S5, the CPU 32 captures image data from the imaging unit 30 into the WRAM 36, and displays the image on the LCD 18 via the image processing unit 38 in step S7. Then, in step S9, the CPU 32 determines whether or not there is an operation input of shutter operation from the operation switches 20. If "NO" in step S9, that is, in a case where there is no shutter operation, the process returns to step S7 and the CPU 32 displays a new image from the imaging unit 30 on the LCD 18. Since the processings in step S7 and step S9 are performed in a relatively short time, while the L button 20d is not operated by the operator 80, images are repeatedly captured from the imaging unit 30 and displayed on the LCD 18. This produces an effect as if photograph shooting is performed in real-time. Therefore, the operator 80 can take a photograph while checking the image displayed on the LCD 18.

On the other hand, if "YES" in step S9, that is, in a case where there is an operation input of shutter operation by the operator 80, the CPU 32 stores data corresponding to the portion of the relevant partial image in the data from the imaging unit 30, as the n-th image, in the split image data storage area 68 of the WRAM 36. It is noted that, in step S11, although not shown here, data on the stored partial image is displayed on the LCD 18, as shown in the middle of FIG. 5.

Then, the CPU 32 increments the variable n in step S13 and the process returns to the step S5 to determine again whether or not the variable n has exceeded the predetermined value nmax, that is, whether or not a required number of partial images has been photographed. In this way, all the partial images for a montage image are photographed and stored as a first image, a second image, etc. in the split image storage area 68 of the WRAM 36, and also the photographed partial images are displayed on the LCD 18. If "YES" in step S5, the process proceeds to step S15.

In step S15, the CPU 32 determines whether or not to adjust the luminance for the photographed partial images. For example, such a message as "Do you want to adjust brightness?" is displayed on the LCD 18 to prompt the operator 80 to select "Yes/No" through the operation of the action switches 20b. If "NO" in step S15, that is, in a case where the operator 80 has decided not to adjust the luminance, the process moves to step S21.

On the other hand, if "YES" in step S15, the CPU 32 performs luminance adjustment for each partial image in succeeding step S17. For example, the CPU 32 prompts the operator 80 to select a partial image to be adjusted with the operation of the direction switch 20a in the vertical direction. Then, in response to the operation of the direction switch 20a in the horizontal direction, the luminance data for the relevant partial image is changed, and the image with the luminance altered is displayed on the LCD 18. Therefore, the operator 80 can adjust the luminance for each partial image while checking the image displayed on the LCD 18. Subsequently, in step S19, the CPU 32 determines whether or not the luminance adjustment is OK, that is, for example, whether or not there is an operation input indicating the determination of a luminance setting from the action switches 20b. If "NO" in step S19, the process returns to step S17 to adjust the luminance again in accordance with the operation input by the operator 80. If "YES" in step S19, the CPU 32 terminates the luminance adjustment and the process moves to step S21.

It is noted that, although luminance adjustment for each partial image is performed before boundary processing in this embodiment, it may be done after boundary processing instead.

Figure 9:
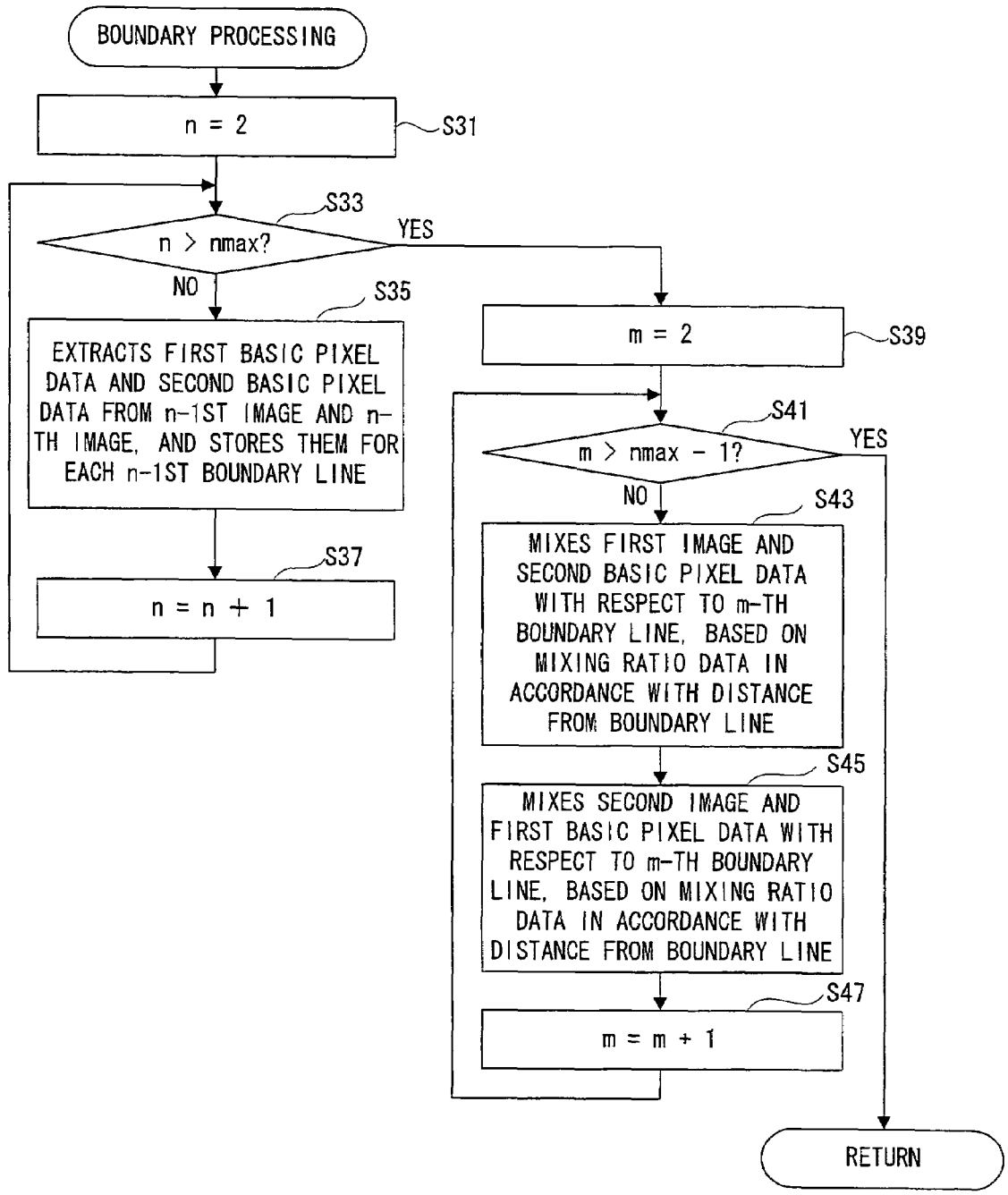
FIG. 9 is a flowchart showing one example of a boundary processing in FIG. 8.

In step S21, the CPU 32 carries out boundary processing. FIG. 9 shows one detailed example of this boundary processing. As described in FIG. 9, the CPU 32 first sets a variable n for specifying the ordinal number for a partial image, to 2 as the initial value in step S31. Then, the CPU 32 determines whether or not the value of the variable n is larger than the predetermined number of partial images nmax in step S33. If "NO" in step S33, the CPU 32, with respect to the n−1st boundary line 88, extracts the first basic pixel data and the second basic pixel data adjacent to the boundary line 88, from the image data of the n−1st image and the n-th image stored in the split image data storage area 68, respectively, and then stores the pixel data in the boundary pixel data storage area 70, as boundary pixel data on the relevant boundary line 88, in succeeding step S35. Then, the CPU 32 increments the variable n in step S37, and the process returns to step S33 to determine again whether or not the variable n has exceeded the number of partial images nmax. In other words, the CPU 32 determines whether or not the first basic pixel data and the second basic pixel data have been extracted for all the boundary lines 88. In this way, with respect to all the boundary lines 88, the pixel data adjacent to the relevant boundary line 88 is extracted for use in image mixture and is stored in other storage areas.

If "YES" in step S33, the CPU 32 sets a variable m for specifying the ordinal number for the boundary line 88, to 1 as the initial value in step S39, and determines whether or not the value of the variable m is nmax−1, that is, whether or not the value of the variable m has exceeded the number of boundary lines, in step S41. If "NO" in step 41, the CPU 32, with respect to the m-th boundary line 88, mixes the image on one side with the second basic pixel data extracted from the image on the other side, based on the mixing ratio data in accordance with the distance from the boundary line 88, in step S43. Then, the CPU 32, with respect to the m-th boundary line, mixes the image on the other side with the first basic pixel data extracted from the image on the one side, based on the mixing ratio data in accordance with the distance from the boundary line 88, in step S45. More specifically, for example, with respect to each of the pixels within a predetermined range in the vicinity of the relevant boundary line 88 (in this embodiment, five pixels on each side perpendicular to the boundary line 88), the CPU 32 decides the mixing ratio to be applied depending on the distance from the boundary line 88, and totalling the original pixel image multiplied by its proportion and the basic pixel data on the opposite side in the same pixel row (perpendicular to the boundary line 88) multiplied by its proportion, and takes the calculated value as new pixel data after image mixture with respect to the relevant pixel.

Next, the CPU 32 increments the variable m in step S47, and the process returns to step S41 to determine again whether or not the variable m has exceeded the number of boundary lines in step S41. In this way, a partial image on one side is mixed with a partial image on the other side with respect to all the boundary lines 88. If "YES" in step S41, the CPU 32 terminates this boundary processing, and the process returns to step S23 described in FIG. 8.

In step S23 shown in FIG. 8, the CPU 32 generates one montage image by combining the data of the partial images mixed by the above-described boundary processing, and displays the montage image on the LCD 18 via the image processing unit 38.

According to this embodiment, it is possible to provide the pleasure of photograph shooting, which thus allows an operator to enjoy freer, more interesting montage image composition. Also it is possible to successively photograph partial images of the face and then instantly display a montage image on the LCD 18. Also, since partial images are mixed on the basis of the mixing ratios in accordance with the distance from the boundary line 88, it is possible to display a montage image with a less visible boundary line. This makes it possible to easily compose a montage image with a less visible boundary line while providing the operator 80 or the like with the enjoyment of photograph shooting. Therefore, the operator 80 or the like can enjoy producing a montage image in a casual way.

In addition, since predetermined mixing ratio data is stored in advance, it is possible to mix partial images through simple processing and make the boundary line less visible, without the need to calculate a mixing ratio of the partial images again later.

Furthermore, pixel data adjacent to the boundary line 88 is stored, as basic pixel data to be used for image mixture, in the boundary pixel data storage area 70, and, in image mixture, basic pixel data in the corresponding pixel row is used, which allows the boundary line 88 to be made less visible through simple processing.

It is noted that, although a face is photographed in two partial images as shown in FIG. 5 in the above-described embodiment, it is of course obvious that the face may be photographed in more than two or three partial images. In the case of splitting a face image into three: upper, middle and lower areas, for example, the image may be split in such a manner that the upper area includes eyes, the middle area a nose and the lower area a mouth. In this case, a partial image of the middle area can be easily photographed by aligning the mouth of an object with the mouth index 82c for the lower area. Additionally, photograph shooting may be made easier by displaying a nose index for indicating the position of a nose, as an imaging index 82, in the middle area as well.

Moreover, in each of the above mentioned embodiments, image mixture can be done through simple processing by storing mixing ratio data determined in advance for each distance from the boundary line 88 (the number of pixels) as shown in FIG. 7. Alternatively, the mixing ratios may be calculated as occasion requires, for example, by interpolation or extrapolation depending on the distance from the boundary line 88, as long as the processing is not too heavy of a burden.

Furthermore, in each of the above mentioned embodiments, a game apparatus including the portable game machine 12 and the camera cartridge 14 is shown as one example of the photographed image composing apparatus 10. However, it is of course obvious that the form of a photographed image composing apparatus may be changed as necessary, and that, for example, the apparatus may be a camera-equipped mobile phone, camera-equipped personal digital assistant or electronic camera or the like. If the photographed image composing apparatus 10 can be connected to such a network as the Internet, a photographed image composing program and data may be downloaded from a server on the network into the memory of the system 10, instead of storing the program and data in advance in the ROM or HDD of the system 10 or other connectable external storage media.

Although the exemplary embodiment presented herein has been described and illustrated in detail, it is clearly understood that the same is by way of illustration and example only and is not to be taken by way of limitation, the spirit and scope of the exemplary embodiment being limited only by the terms of the appended claims.

What is claimed is:

1. A photographed image composing apparatus for photographing a face in at least two different partial images and generating a montage image of the face from at least two photographed partial images, comprising:

an imaging camera for electronically photographing an object;

an image display for displaying the object photographed by said imaging camera;

imaging guide displaying programmed logic circuitry for displaying an imaging guide indicating the position of a predetermined region of the face on said image display;

operation programmed logic circuitry for inputting an operation input in accordance with an operation by an operator;

first image storing locations for storing image data from said imaging camera that shows one of the partial images of said face, as a first image, in response to the operation input from said operation programmed logic circuitry;

second image storing locations for storing image data from said imaging camera that shows the other one of the partial images of said face adjacent to said first image, as a second image, in response to the operation input from said operation programmed logic circuitry;

mixing ratio storage locations for storing mixing ratios of pixel data of said first image and said second image in accordance with the distance from a boundary line between said two partial images;

image mixing programmed logic circuitry for mixing said first image and said second image based on said mixing ratios;

montage image generating/displaying programmed logic circuitry for generating a montage image from said first image and said second image mixed by said image mixing programmed logic circuitry and for displaying said montage image on said image display;

first basic pixel data storing locations for storing pixel data on said first image only along and adjacent to said boundary line as first basic pixel data; and second basic pixel data storing locations for storing pixel data on said second image only along and adjacent to said boundary line as second basic pixel data, wherein said image mixing programmed logic circuitry mixes pixel data of said first image and said second image with said second basic pixel data and said first basic pixel data in a pixel row perpendicular to said boundary line that corresponds to the relevant pixel, respectively, based on said mixing ratios.

2. A photographed image composing apparatus according to claim 1, wherein said mixing ratio storage locations store mixing ratios determined in such a manner that pixel data of said first image and said second image closest to said boundary line are mixed with largest amounts of pixel data of said second image and said first image, respectively, and that, as the distance from said boundary line on said first image and said second image increases, pixel data of said first image and said second image at said distance are mixed with gradually decreased amounts of pixel data of said second image and said first image, respectively.

3. A storage medium storing a photographed image composing program for photographing a face in at least two different partial images and generating a montage image of the face from at least two photographed partial images, in a photographed image composing apparatus that comprises at least an imaging camera for electronically photographing an object, an image display for displaying the object photographed by said imaging camera, and an operation programmed logic circuit for inputting an operation input in with an operation by an operator, wherein said photographed image composing program causes a processor of said photographed image composing apparatus to execute the following:

imaging guide displaying for displaying an imaging guide indicating a position of a predetermined region of the face on said image display;

first image storing for storing image data from said imaging camera that shows one of the partial images of said face, as a first image, in response to the operation input from said operation programmed logic circuit;

second image storing for storing image data from said imaging camera that shows the other one of the partial images of said face adjacent to said first image, as a second image, in response to the operation input from said operation programmed logic circuit;

image mixing for mixing said first image and said second image based on mixing ratios of pixel data of said first image and said second image in accordance with the distance from a boundary line between said two partial images; and montage image generating/displaying for generating a montage image from said first image and said second image mixed in said image mixing and displaying the montage image on said image display;

first basic pixel data storing for storing pixel data on said first image only along and adjacent to said boundary line, as first basic pixel data, and second basic pixel data storing for storing pixel data on said second image only along and adjacent to said boundary line, as second basic pixel data, wherein said image mixing mixes pixel data of said first image and said second image with said second basic pixel data and said first basic pixel data in a pixel row perpendicular to said boundary line that corresponds to the relevant pixel, respectively, based on said mixing ratios.

4. A storage medium storing a photographed image composing program according to claim 3, wherein said photographed image composing apparatus further comprises mixing ratio storage locations for storing mixing ratios determined in such a manner that pixel data of said first image and said second image closest to said boundary line are mixed with the largest amounts of pixel data of said second image and said first image, respectively, and that, as the distance from said boundary line on said first image and said second image increases, pixel data of said first image and said second image at said distance are mixed with gradually decreased amounts of pixel data of said second image and said first image, respectively; and wherein said image mixing mixes said first image and said second image based on said mixing ratios stored in said mixing ratio storage locations.

5. A method of generating a composite image from at least two photographed images, comprising:
(a) photographing one object;
(b) storing a first photographed image of said one object;
(c) photographing another object;
(d) storing a second photographed image of said another object;
(e) combining part of the first photographed image with part of the second photographed image to compose a composite image such that the boundary between the two images is made less visible by processing image data in the vicinity of the boundary; and
(f) displaying the composite image;

wherein said combining the images includes processing image data on one side of the boundary between the images using data on the other side of the boundary located only adjacent to said boundary.

6. A method according to claim 5, wherein said image data on one side of the boundary is processed based on stored ratios.

7. A method according to claim 5, wherein said image data on one side of the boundary is processed based on ratios calculated according to distance from the boundary between the images.

8. A method according to claim 5, wherein the combining includes determining the image pixel data on one side of the boundary between the images based on pixels on the other side of the boundary as a function of pixel distance from the boundary.

9. A method according to claim 5, wherein the one object is one person's face and the other object is another person's face.

* * * * *